Patented Aug. 15, 1933

1,922,328

UNITED STATES PATENT OFFICE 1,922,328

PROCESS OF PREPARING SYNTHETIC RUTILE TITANIUM DIOXIDE

Herbert L. Rhodes, Oakland, Calif.

No Drawing. Application December 23, 1931
Serial No. 582,880

11 Claims. (Cl. 23—202)

This invention is a process of preparing synthetic rutile titanium dioxide and has special reference to a process in which a rutile seeding crystal is first formed and which is then employed to hydrolyze rutile titanium dioxide from a titanium sulphate solution.

In the hydrolysis of a titanium sulphate solution by boiling, or the hydrolysis by mixing a hot titanium sulphate solution with hot water, anatase crystal titanium dioxide results.

Rutile crystal titanium dioxide has greater hiding power than anatase crystal titanium dioxide, when used as a pigment.

Titanium dioxide prepared according to Macklenburg patent U. S. No. 1,758,528 yields anatase titanium dioxide. The seed suspension resulting therefrom is produced from a sulphuric acid solution. In my process sulphuric acid and soluble sulphates must be absent. I have found that a seeding crystal is formed by neutralizing an alkali metal titanate with a halogen acid and that by treating a titanium sulphate solution with a small quantity of the seeding crystal, a rutile crystal titanium dioxide is formed.

The main object of the invention therefore, is to prepare a rutile crystal titanium dioxide.

Another object of the invention is to prepare a seeding crystal from an alkali metal titanate by neutralization with a halogen acid.

A further object of the invention is to prepare a rutile crystal titanium dioxide from a titanium sulphate solution by addition of a halogen acid neutralized alkali metal titanate.

Other objects and advantages of the invention will become apparent as the process is set forth in the following description.

In the formation of rutile crystal titanium dioxide by my method, it is first necessary to form a rutile seeding crystal. Such a crystal cannot be formed from a solution containing sulphuric acid or soluble sulphates.

An alkali metal titanate is first formed by mixing together one hundred pounds pure titanium dioxide and one hundred pounds sodium hydroxide free of sulphates, heating the mixture to a temperature of 700° C. and maintaining this temperature for one hour.

The titanate is then removed from the heat and lixiviated with a ten percent hydrochloric acid solution to neutralization, using methyl orange as an indicator.

This mixture is then added to a tank containing 5,000 gallons of titanium sulphate solution having substantially the following composition:—

| | Gramms per liter |
|---|---|
| Titanium dioxide | 250 |
| Iron | 25 |
| Sulphuric acid | 575 |

This mixture of titanium sulphate solution and seeding crystal are then boiled for from four to five hours, this solution normally boiling at a temperature of 110° to 115° C. This operation hydrolyzes the titanium dioxide from the solution which is composed of rutile crystals, these rutile crystals having substantially 50% greater hiding power than titanium dioxide of the anatase crystal form.

It will be noted that in this process any of the alkali hydroxides may be used, provided they are free of sulphates, and that potassium hydroxide is particularly desirable so far as results are concerned, but are not so desirable from an economic standpoint, due to the normally higher price of potassium. Also, any of the halogen acids may be employed, such as hydrobromic, hydrochloric, hydriodic and hydrofluoric. The most desirable combination, however, is in the use of sodium hydroxide in forming the titanate and the hydrochloric acid for the leaching or lixiviation process for forming the seeding crystals. After the seeding crystals are once formed, the seeding crystals will function efficiently in the titanium sulphate solution, forming an artificial rutile crystal titanium dioxide which is identical in all respects to the natural mineral rutile.

Having described an operative process of forming rutile crystal titanium dioxide, and a seeding crystal, it will be understood that the variations in chemical elements and combinations, as also in proportions, which are consistent with the appended claims, may be resorted to without detracting from the spirit or scope of the invention or sacrificing any of the advantages thereof.

I claim:

1. A process for producing a rutile seeding crystal comprising combining an alkali metal titanate and a halogen acid to form a neutral mix, using methyl orange as an indicator.

2. A process for preparing a rutile crystal titanium dioxide consisting in preparing a rutile seeding crystal by combining an alkali metal titanate with a halogen acid to a neutral mix, using methyl orange as an indicator, adding the seeding crystal to a titanium sulphate solution and boiling the mixture.

3. A process for preparing a rutile crystal titanium dioxide consisting in adding to a solution of titanium sulphate, a rutile seeding crystal prepared by combining an alkali metal titanate and a halogen acid to form a neutral mix, using methyl orange as an indicator.

4. A process for preparing a rutile crystal titanium dioxide which consists in heating a mixture of titanium dioxide and alkali hydroxide to 700° C. to form an alkali metal titanate, leaching the titanate with an aqueous solution of a halogen acid to neutralization as indicated by methyl orange, thereby forming an aqueous solution of alkali halide containing rutile seed crystals, adding the aqueous solution containing rutile seed crystals to a solution of titanium sulphate and hydrolizing the titanium sulphate to precipitate titanium dioxide in the rutile form by boiling the mixed solutions.

5. A process for preparing a rutile crystal titanium dioxide which consists in boiling together a solution of titanium sulphate and a rutile seed crystal, to hydrolize the titanium sulphate and precipitate rutile crystal titanium dioxide.

6. A process for preparing a rutile crystal titanium dioxide which consists in boiling together a solution of titanium sulphate, and a rutile seed crystal formed by heating together an alkali hydroxide and titanium dioxide to form an alkali titanate, and neutralizing the titanate with an aqueous solution of a halogen acid.

7. A process for preparing a rutile crystal titanium dioxide which consists in precipitating rutile crystal titanium dioxide by boiling a titanium sulphate solution in the presence of rutile seed crystals formed from an alkali titanate by leaching the alkali titanate with an aqueous solution of hydrochloric acid to neutralization as indicated by methyl orange.

8. A process for preparing a rutile crystal titanium dioxide which consists in boiling together a solution of titanium sulphate, and rutile seed crystals formed by heating together sodium hydroxide and titanium dioxide to form sodium titanate and leaching the titanate with an aqueous solution of hydrochloric acid to neutralization as indicated by methyl orange.

9. A process for preparing a rutile crystal titanium dioxide which consists in boiling together a solution of titanium sulphate, and rutile seed crystals formed by heating together, to 700° C., for one hour, equal parts by weight of sodium hydroxide and titanium dioxide to form sodium titanate and leaching the titanate with an aqueous solution of hydrochloric acid to neutralization using methyl orange as an indicator.

10. A process for preparing a rutile crystal titanium dioxide which consists in heating together to 700° C. for one hour, a mixture of sodium hydroxide and titanium dioxide to form sodium titanate, leaching the titanate with a ten percent solution of hydrochloric acid to neutralization as indicated by methyl orange thereby forming rutile seed crystals, adding the rutile seed crystals to a solution of titanium sulphate and boiling for a period of four hours to hydrolize the titanium sulphate and precipitate titanium dioxide in rutile crystal form.

11. A process for preparing a rutile crystal titanium dioxide which consists in mixing titanium dioxide with sodium hydroxide, heating said mixture to 700° C. to form alkali metal titanate, leaching the mass with 10% hydrochloric acid so as to slowly neutralize the same as indicated by methyl orange and thus forming a mixture of rutile seed crystals, adding the mixture of seed crystals to a solution of titanium sulphate in proportions of 1 to 10 parts seed crystals to each 100 parts titanium sulphate, boiling the titanium sulphate solution containing seed crystals about four hours so as to hydrolize the titanium sulphate and precipitate titanium dioxide in the rutile form.

HERBERT L. RHODES.